(No Model.)
H. S. MAXIM.
ELECTRIC LAMP.
No. 254,032.   Patented Feb. 21, 1882.
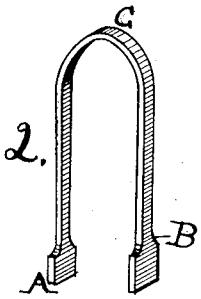
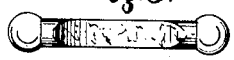
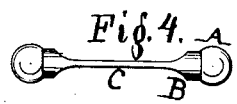
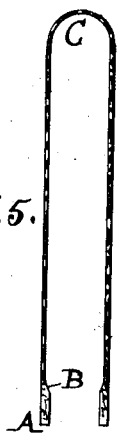
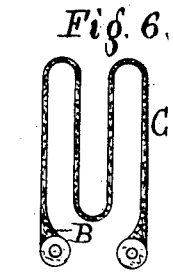
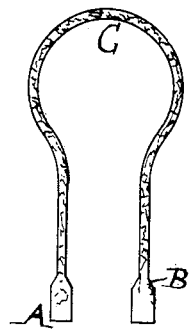
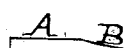
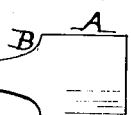
Witnesses;
W. Stanley Jr.
Wm. A. Barnes.
Inventor;—
Hiram S. Maxim.
per
Parker W. Page
atty.

UNITED STATES PATENT OFFICE.

HIRAM S. MAXIM, OF BROOKLYN, ASSIGNOR TO THE UNITED STATES ELECTRIC LIGHTING COMPANY, OF NEW YORK, N. Y.

ELECTRIC LAMP.

SPECIFICATION forming part of Letters Patent No. 254,032, dated February 21, 1882.

Application filed March 31, 1881. (No model.)

*To all whom it may concern:*

Be it known that I, HIRAM S. MAXIM, of the city of Brooklyn, county of Kings, and State of New York, have invented certain new and useful Improvements in Electric Lamps; and I do hereby declare the following to be a full and exact description of the invention, reference being had to the drawings accompanying and forming a part of the specification.

My invention relates to electric lamps giving light by the incandescence of a continuous strip of carbon, or of a substance possessing the same characteristics contained within an exhausted glass receiver. In these lamps, as is well known, the carbon is included in the electric circuit by attachments directly, or by the interposition of pieces of carbon of relatively large size, to metallic conductors. In order to secure a durable connection between the wires and the carbons, it is necessary either to enlarge that portion of the latter with which the metal comes in contact or to employ instead washers or blocks of carbon of relatively large size, which inclose the ends of the carbon strip and connect with suitable holders in communication with the wires. This necessity arises from the intense heat of the incandescent portion of the carbon, due to its reduced size and high resistance, and unless some refractory substance in sufficient quantity to convey the current without becoming incandescent be interposed, as set forth, the connections would soon be destroyed. The means hitherto resorted to for obviating this difficulty fulfill only in a slight degree the end for which they are designed, on account of certain radical defects in their construction and operation, which I will now proceed to point out. In all cases, so far as I am at present aware, where the enlarged ends were integral with the main body of the carbon the increase in size was made so abrupt that square shoulders were left at those points where the delicate strip ended and the enlargements began. Carbons thus formed break off in a short time at or very near the shoulders. The causes operating to bring this about are that the heat at these points is necessarily greater than at any others, for owing to the surrounding mass of carbon it is largely prevented from radiating. It is further caused by a strong tendency of the electric current in the high vacuum that these lamps require to leave the conducting material, when its direction is altered, at a sharp angle, and to form an arc across the angle thus formed near its vertex. This effects a mechanical transfer or displacement of the particles of carbon which eats away the conducting-strip at one point until an actual separation of the parts occurs, and the lamp is thereby rendered useless. Where a carbon is formed with the clamping ends enlarged suddenly, so as to form a square shoulder, the current, when concentrated, as it were, in passing from the enlargement to the main part of the conductor does not confine itself to the carbon, but passes across the angular space in the form of an arc, which rapidly destroys the lamp. When clamps or washers of carbon are employed a further difficulty is encountered in securing a perfect electrical contact, without which the washers are eaten away by minute arcs at those portions in mechanical contact only with the incandescent strip.

The object of my invention is to so improve the construction of the carbons as to entirely avoid the detrimental effects of the current led through them in the manner described in the foregoing; and this I accomplish as follows: The strips are formed of carbon or any compound possessing similar characteristics by any of the usual methods, with a diameter and density necessary for offering the desired amount of resistance. The ends of the strips, as hitherto, are enlarged, but the increase in size is gradual, so that butts or clamping ends are formed, which taper down gradually to the size of the incandescent portion.

In the accompanying drawings I have illustrated my invention as applied to carbons of various kinds.

Figure 1 is a theoretical illustration of the invention. In this it is evident that with a single step or shoulder the current would have a tendency to leave the carbon and form an arc, and that in proportion to the increase in the number of the steps this tendency would be lessened until, with a taper or curve, it would be reduced to a minimum. Fig. 2 shows a conductor which is made from a flat strip of fibrous material bent into the form of a loop and then carbonized. The ends are enlarged and taper down gradually to the desired size for the strip. Figs. 3 and 4 are other forms of carbons embodying my invention. Figs. 5, 6, and 7 are loops of carbon cut from fibrous material and carbonized. They are designed to illustrate the various shapes that may be given to the ends; and Figs. 8 and 9 are theoretical views of strips, showing different curves which may be employed in reducing the size of the ends.

In all the figures the letter A represents the enlarged end, which is straight along a portion of its length, and tapers down on one or more sides, as at B, to conform to the shape and size of the incandescent portion C. Clamping ends are thus formed, which, from their size, convey the current without becoming heated to incandescence, and thus protect the metallic connections.

The invention is applicable to all forms of continuous carbon conductors designed for incandescent lighting, however they may be made.

Having thus described my invention, what I claim as new, and desire to secure by Letters Patent, is—

1. In an incandescent electric lamp, the combination, with the conductors sealed therein, of a continuous conductor of carbon gradually enlarged at or near its ends, substantially as and for the purposes set forth.

2. A continuous conductor of carbon for use with an incandescent electric lamp, consisting of the stem C, having enlarged portion A and gradually-tapering portion B, substantially as and for the purposes set forth.

In testimony whereof I have hereunto set my hand this 29th day of March, 1881.

HIRAM S. MAXIM.

Witnesses:
W. STANLEY, Jr.,
WM. H. TUCKER.